United States Patent
Loseries et al.

[11] 3,788,204
[45] Jan. 29, 1974

[54] SWINGING-SECTOR CAMERA SHUTTER WITH WARNING INDICATOR

[75] Inventors: Peter Loseries, Diez, Germany; Toshio Hayashi, Osaka, Japan

[73] Assignees: Minolta Camera Co. Ltd., Osaka, Japan; Ernst Leitz GmbH, Wetzlar, Germany

[22] Filed: Mar. 30, 1973

[21] Appl. No.: 346,575

[30] Foreign Application Priority Data
Apr. 11, 1972  Japan.............................. 47/36248

[52] U.S. Cl. .................................................. 95/55
[51] Int. Cl. ............................................. G03b 9/36
[58] Field of Search................................ 95/55, 59

[56] References Cited
UNITED STATES PATENTS
3,628,438   12/1971   Loseries................................ 95/55

*Primary Examiner*—Samuel S. Matthews
*Assistant Examiner*—Michael L. Gellner
*Attorney, Agent, or Firm*—Krafft & Wells; Gilbert L. Wells

[57] ABSTRACT

A swinging-sector camera shutter having a plurality of sectors. Each sector has a plurality of blades which execute a combined rotary-sliding motion. The shutter has a control lever which, when the shutter is cocked, successively engages the operating cranks of the first slide and the second slide and moves same. The second slide is held, in the initial position, by a pawl subjected to the force of a spring, which latter disengages the pawl and is hingedly connected with its other end to the control lever and is tensioned at the beginning of the operation of the control lever. The shutter has a holding magnet to which voltage is applied at least at the beginning of the operation of the control lever and this magnet holds the pawl in the locking position against the force of the spring until current is cut off by the timer control device. The shutter is provided additionally with a displaceable and pivotable warning lever, one end of which is held, by a pawl, in contact with the magnet by spring or magnetic force, outside of the range of motion of the operating crank of the first rotary slide. This warning lever is pulled into this range of motion by spring force and is shifted, by the operating crank into a viewing aperture when the pawl, during the operation of the control lever, is lifted off the magnet before the operating crank has reached its final position in the released position.

4 Claims, 4 Drawing Figures

PATENTED JAN 29 1974 3,788,204

PATENTED JAN 29 1974

SWINGING-SECTOR CAMERA SHUTTER WITH WARNING INDICATOR

CROSS REFERENCES TO RELATED APPLICATIONS

Applicants claim priority under 35 U.S.C. 119 for Application Ser. No. Sho-47-36248, filed Apr. 11, 1972, in the Patent Office of Japan.

The disclosure of U.S. Application Ser. No. 267,228, filed June 28, 1972, is incorporated herein to show the state of the art of actuating and control mechanisms for swinging-sector camera shutters. In addition, the disclosure of assignee's copending Application Ser. No. 346,576, filed on the same date as the present application, of Peter Loseries and Toshio Hayashi, and having the title "Swinging-Sector Camera Shutters with Improved Warning Indicator", is incorporated herein.

BACKGROUND OF THE INVENTION

The field of the invention is pivoted blade shutters for photographic cameras. The invention is particularly concerned with actuating and control mechanisms for swinging-sector shutters for photographic cameras wherein the swinging-sectors are divided into a plurality of blades.

The disclosure of U.S. Pat. No. 3,628,438 which shows the state of the art of swinging-sector camera shutters is incorporated herein.

In particular, the invention is directed to a cocking and control device having a control lever which, when the shutter is cocked, first seizes and moves the operating crank of the first rotary slide and thereafter the operating crank of the second rotary slide. The second slide is held, at the end of the windup step, i.e. in the cocked condition, by a pawl, which latter is held in the blocking position, prior to the beginning of the release of the shutter, by means of a spring and, after the beginning of the release of the shutter, by means of a holding magnet, according to U.S. Patent Application Ser. No. 267,228, filed June 28, 1972.

In such an apparatus, the holding magnet is part of the electronic timer. At the beginning of the shutter release, this magnet is energized and retains the pawl in engagement with the second rotary slide until the electronically computed exposure time has elapsed. Thereafter, the magnet is deenergized and the pawl can release the second rotary slide. If the holding magnet is inoperable for some reason, for example because the battery of the electronic timer control device is run down, the second rotary slide, during the release of the shutter, is not held by the pawl but rather runs off practically simultaneously with the manually triggered first rotary slide.

In order to draw the attention of the camera user to such a run-down battery, it has been suggested by the prior art, in a reflex camera, to stop a drive member of the reflex mirror in its upward movement by means of an element cooperating with the magnet, so that the half upwardly flipped position of the mirror draws the user's attention to the run-down battery. Another conventional suggestion provides that in such a case the operation of the shutter is made possible without shutter opening and simultaneously the film transport lever and the shutter windup lever is blocked against further actuation.

However, both arrangements for warning the camera user have grave disadvantages. In the former case, the mirror must be manually pressed back into its starting position after the convertible objective has been removed, by reaching into the camera opening. In the latter case, there is the danger that the user operates the block windup lever with too much force, thus damaging the mechanism.

SUMMARY OF THE INVENTION

Therefore, having in mind the limitations of the prior art, there is a need for supplementing the cocking and control mechanisms of swinging-sector shutters of the above-mentioned types by a warning mechanism which, on the one hand, clearly indicates the run down battery to the user, but, on the other hand, is not suitable for causing damage to the camera or for increasing the number of setting procedures.

This problem is solved according to the present invention by providing the control device additionally with a slidable and pivotable warning lever. One end of the warning lever is held by the locking lever contacting the magnet by spring force or magnetic force outside of the range of movement of the drive crank of the first rotary slide. The warning lever is pulled, by spring force, into this zone of movement and is shifted by the operating crank into a viewing aperture when the locking lever, during the operating cycle of the control lever, is lifted off the magnet before the operating crank has reached its terminal position in the run-off condition.

Since, in the case of a fully functional magnet, the locking lever is maintained in contact with the magnet until the operating crank of the first slide has reached its released condition, the warning lever is normally not actuated in any way by the operating crank. Rather, the warning lever is held, by the locking lever contacting the magnet, out of the movement range of the operating crank. However, if the magnet does not receive any current shortly prior to the operating cycle of the shutter, for example because the battery is too weak, the locking lever is lifted off the magnet at the beginning of the operating cycle of the control lever. This action is due to the spring connection between the control lever and the locking lever. Thereby, the warning lever is freed for pivoting- even before the operating crank of the first slide is actuated - during which step the warning lever enters, with one end, the range of motion of the operating crank of the first slide and, once the latter has moved into its rundown position, is shifted into a viewing aperature. The camera operator can see from this that the magnet has not responded. In most cases, this is an indication that the battery is run down. However, there is also the possibility that the lack of response of the magnet is caused by a defective circuit. In any event, the appearance of the signal is an indication for the operator that the shutter has been released without opening. The reason for this will be described in greater detail with reference to the embodiment.

The specific configuration of the warning lever is arbitrary, but normally a lever will be employed which is supported on a pin fixedly attached to the base plate by means of a slotted hole and which is tiltable about the pin and displaceable on the pin. When a shutter equipped with this warning lever is installed in a camera, the warning lever proper can either be displaceable directly into a viewing aperature, preferably into the viewfinder; or it is also possible to arrange a further lever operated by the warning lever, which further lever then appears, in turn, in the viewfinder in a suitable manner.

DESCRIPTION OF THE PREFERRED EMBODIMENTS

Figure 1:
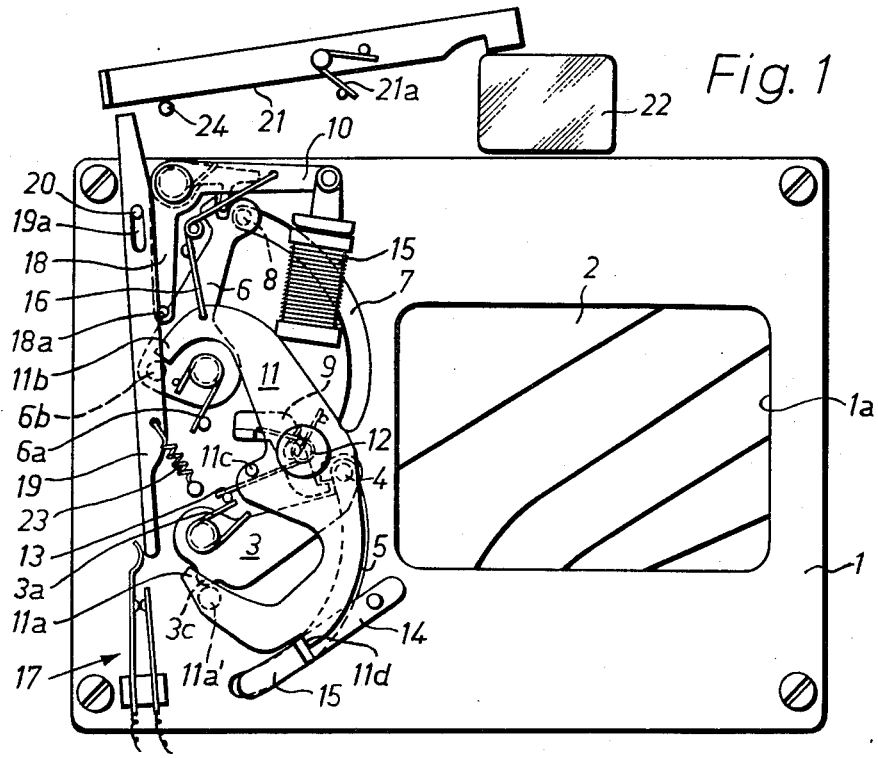
FIG. 1 shows in an elevational view, a shutter with a cocking and control device in the cocked condition and with the warning lever of the present invention.

In FIG. 1, numeral 1 denotes the shutter baseplate having an image aperture 1a, behind which a first slide of the shutter, consisting of several blades 2, is visible. This is the slide which, in the cocked condition of the shutter, covers the viewing aperture and the blades of which are moved by means of an operating crank 3, as well as a pin 4 attached to the crank and extending through a circular arc slot 5.

The blades of the second slide, covering the image aperture in the released condition, are disposed, collected into a pack, behind the upper portion of the baseplate 1 in FIG. 1 (as shown in U.S. Pat. No. 3,628,438). They are moved by means of an operating crank 6, as well as a pin 8 attached to this crank and extending through a circular arc slot 7. Two helical springs 3a and 6a, seated on the respective crank axles, serve for moving the operating cranks 3 and 6.

In the cocked position of the shutter, the operating crank 3 is held by a pawl 9, while the operating crank 6 is held by a pawl 10.

In order to place the operating cranks 3 and 6, from a position in the released condition of the shutter, into their cocked position and later on for the release of the pawl 9, a control lever 11 is provided which represents the main element of the control device. The control lever 11 is fixedly disposed on an axle 12 and is rotatable therewith. The control lever is also biased by a spring 13 mounted on the axle and tending to urge the control lever to rotate in the clockwise direction, as illustrated in FIG. 1.

The control lever 11 has two arms 11a and 11b, as well as a pin 11c fixedly disposed on its central portion. One of the arms, namely arm 11b, engages a pin 6b of the operating crank 6 and, by means of this engaging connection, presses the crank 6 again into its cocked position, when the shutter is cocked by rotation of the control lever 11 in the counterclockwise direction. An analogous operative connection exists between the arm 11a and the operating crank 3 of the first slide, the only difference being that, in this case, the pin 11a' is fixedly arranged on the arm 11a. The pin 11c of the control lever cooperates with the pawl 9. Besides, the control lever 11 also has a projecting lug 11d behind which, in the cocked condition of the shutter, a pawl 14 engages. This pawl is the actual shutter release which must be actuated when the shutter is freed for executing its operating cycle.

The pawl 10 furthermore cooperates with a holding magnet 15 so that the pawl is held, against spring force, in the engagement position while the first shutter is in operation. The construction is such that the throw-off spring force occurs only when the control lever is freed for its operation, since this spring 16 is tensioned in the operating direction by the control lever only when the latter rotates in the clockwise direction.

The parts and their functions described heretofore are disclosed in the apparatus according to U.S. Patent Application Ser. No. 267,228. Additionally thereto, a warning lever 19 is now provided, which is mounted, by means of a slotted hole 19a, on a pin 20 fixedly attached to the baseplate. A spring 23 engages the lower end of the warning lever, tending to pivot the latter in the counterclockwise direction about the pin 20. This pivoting motion is prevented by a pin 18a fixedly seated on an arm 18 of the pawl 10. Thus, the pawl, in a departure from the pawl of Application Ser. No. 267,228, is fashioned herein as a right angled lever. With its lower end, the warning lever 19 extends into the zone of motion of the oeprating crank 3 and can be longitudinally shifted along the pin 20 by this crank, if desired.

A sighting lever 21 also cooperates with the warning lever 19. This sighting lever is under the force of a spring 21a which tends to rotate the lever in the counterclockwise direction, thus keeping the lever in engagement with a pin 24 fixedly mounted at the camera. By means of the warning lever 19, the sighting lever can, however, be pivoted against the spring force in the clockwise direction, wherein the free end of this sighting lever enters a viewing aperture 22 and is visible therein to the operator of the camera.

The mode of operation of the shutter first of all corresponds fully to that described in Application Ser. No. 267,228.

By releasing the pawl 14, the control lever 11 is released and rotates in a clockwise direction under the bias of the spring 13 and finally lifts off, with its pin 11c, the pawl 9 of the operating crank 3. Thereupon, the first slide runs through its operating cycle, and the blades 2 vacate the image aperture 1a.

Simultaneously with the beginning of the operation of the control lever 11, the magnet 15 is energized and now retains the pawl 10 against the force of the spring 16 and releases the pawl only when the electronic circuit has deenergized the magnet 15. Thereafter, the second slide, driven by the operating crank 6 and the spring 6a, can follow the first slide and again close the image aperture 1a. However, as long as the pawl 10 is still held by the magnet 15, the arm 18 thereof having the pin 18a does not change its position, so that the warning lever 19 is retained by the pin 18a.

Figure 2:
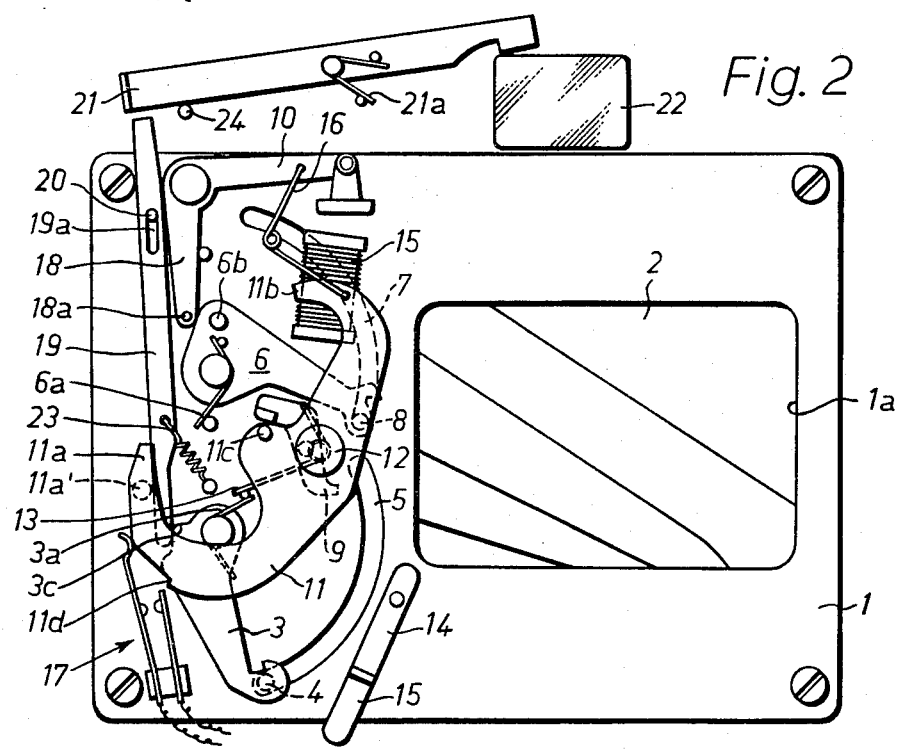
FIG. 2 shows the shutter of FIG. 1 in the released condition, with a functional magnet.

When the magnet 15 finally releases the pawl 10 for rotation during proper operation, the operating crank 3 has reached its released condition. By the rotation of the pawl 10 with arm 18 and pin 18a, the warning lever 19 is now likewise released for rotation by the spring 23. This merely results in the step that the warning lever 19 engages, with its free end, flatly an edge 3c of the operating crank 3. There is, however, no displacement of the warning lever 19 on the pin 20 as shown in FIG. 2.

Figure 3:
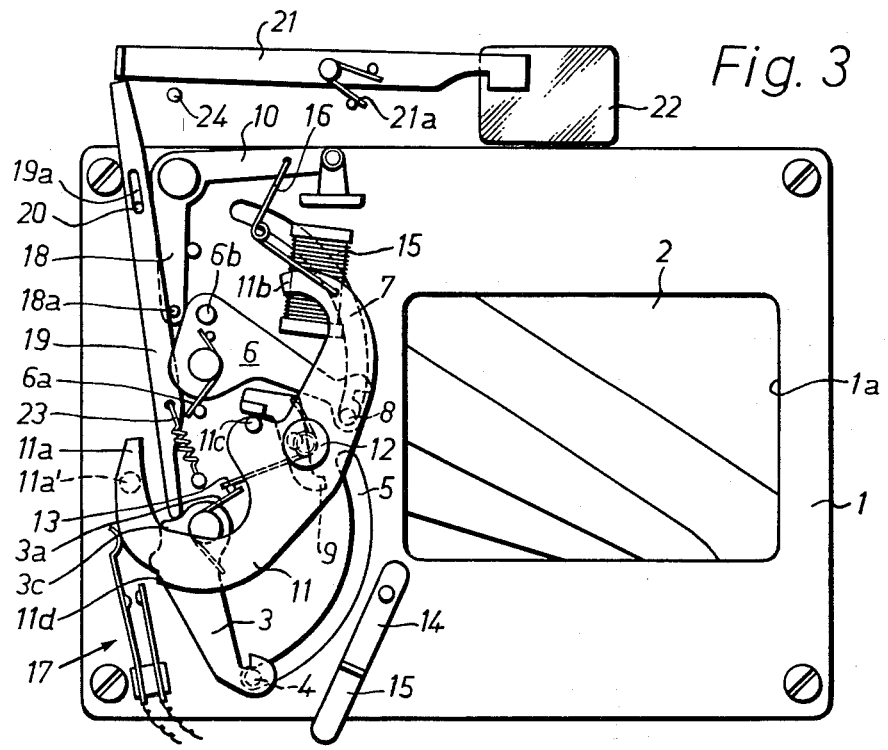
FIG. 3 shows the shutter of FIG. 1 in the released condition, with an inoperable magnet.

However, if the operation does not take place in a proper manner, because the magnet 15 does not receive current for some reason or another, for example because of a run down battery, then the following mode of operation results:

The control lever 11 operates as before, after release by the pawl 14. The control lever also triggers the pawl 9, as described above. However, previously, for example with the beginning of the rotation of the control lever, the pawl 10 had already been lifted off via the spring 16; the pawl 10 rotates counterclockwise and releases the warning lever 19 by means of its pin 18a. The warning lever is rotated by spring 23 about the pin 20 and thus enters, with its lower end, the zone of rotation of the edge 3c of the operating crank 3. When the control lever 11, with its pin 11c, lifts off the pawl 9 of the operating crank 3, both rotary slides move together into their released position. During this step, the slot-forming edges of both slides cover each other, so that the film is not exposed. Besides, toward the end of the operating motion, the lower end of the warning lever 19 is seized by the projection of the edge 3c at the operating crank 3 from below, and the entire warning lever is longitudinally displaced along the pin 20 with its slotted hole. The upper portion of the warning lever thus impinges on one end of the sighting lever 21 and tilts the latter in the clockwise direction, whereby the opposite end of the sighting lever enters the viewing aperture 22 as shown in FIG. 3. In this manner, it is indicated to the operator that the timer control device has not functioned, from which it can be concluded primarily that the battery is run down.

Figure 4:
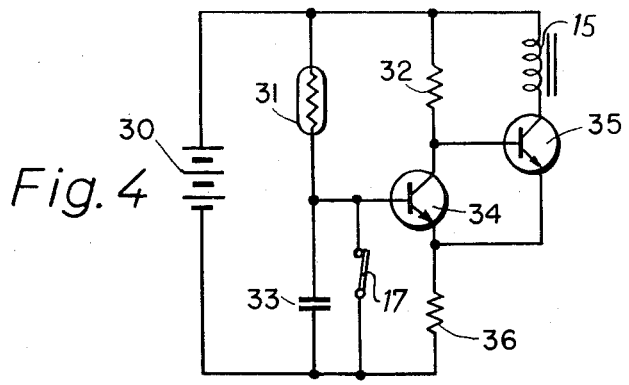
FIG. 4 shows a circuit diagram of the electronic shutter control with the arrangement of the magnet in the electronic circuit.

FIG. 4 shows the circuit of the electronic timer control. The magnet 15 is disposed, in a conventional manner, in the emitter-collector circuit of a trigger controlled by an RC-member. The circuit has therein a battery 30, a cadmium sulfide resistor 31, a resistor 32, a capacitor 33 and first and second transistors 34 and 35. The switch 17 initiates the functioning of the RC-member when it is opened by the control lever 11 at the beginning of the shutter operation.

We claim:

1. In a swinging-sector camera shutter having an image aperture and first and second swinging sectors, each swinging sector including a primary blade and a plurality of covering blades and being adapted for movement to and fro across said image aperture, and means cooperating with the primary blade of each said swinging sector to provide a combined rotary-sliding motion thereof in which the sliding component of motion extends substantially in the direction of the leading edge of the primary blade, means for actuating and tensioning said first and second swinging-sectors, means for providing a time delay between the actuation of said first and second swinging-sectors, said means for actuating and tensioning comprising a control lever having first and second control surfaces, first latching means latching said lever and second latching means connected to a solenoid magnet, said solenoid magnet connected to said means for a time delay, said means for a time delay having a switch actuated by said first control surface, said first control surface connected to a first operating crank which in turn is connected to said means cooperating with the primary blade of said first swinging-sector, said second control surface connected to a second operating crank which in turn is connected to said means cooperating with the primary blade of said second swinging-sector, the improvement comprising: a viewing aperture, a warning lever mounted to be displaceable and pivotable, means for spring biasing said warning lever in contact with said second latching means outside the range of motion of said first operating crank when said second latching means is engaged by said solenoid magnet and for pulling said warning lever into contact with said first operating crank to be shifted into said viewing aperture when said second latching means is disengaged by said solenoid.

2. the swinging-sector camera shutter of claim 1, wherein said warning lever has a slotted hole supported by a pin therein.

3. the swinging-sector camera shutter of claim 2, wherein a sighting lever is mounted therein having a first end abutting an end of said warning lever and a second end extending into said viewing aperture.

4. The swinging-sector camera shutter of claim 1, wherein said viewing aperture is a range finder aperture.

* * * * *